(12) United States Patent
Ramaswamy (10) Patent No.: US 11,863,428 B2
(45) Date of Patent: Jan. 2, 2024

(54) DYNAMIC ROUTE CONFIGURATION AND LOAD BALANCING FOR EDGE GATEWAYS

(71) Applicant: VMWARE, INC., Palo Alto, CA (US)

(72) Inventor: Navaneeth Krishnan Ramaswamy, Chennai (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/787,033

(22) Filed: Feb. 11, 2020

(65) Prior Publication Data

US 2021/0160170 A1 May 27, 2021

(30) Foreign Application Priority Data

Nov. 22, 2019 (IN) .............................. 201941047745

(51) Int. Cl.
*H04L 45/00* (2022.01)
*H04L 12/66* (2006.01)
*H04L 43/08* (2022.01)

(52) U.S. Cl.
CPC .............. *H04L 45/22* (2013.01); *H04L 12/66* (2013.01); *H04L 43/08* (2013.01)

(58) Field of Classification Search
CPC .......... H04L 12/66; H04L 43/08; H04L 45/22
See application file for complete search history.

(56) References Cited

U.S. PATENT DOCUMENTS

| | | | | |
|---|---|---|---|---|
| 6,658,013 B1* | 12/2003 | de Boer | ................... | H04J 3/085 370/224 |
| 6,891,795 B1* | 5/2005 | Hamachi | ................. | H04L 45/02 370/227 |
| 8,108,554 B1* | 1/2012 | Masters | .............. | H04L 12/5691 709/245 |
| 8,203,949 B1* | 6/2012 | Helmy | .................... | H04L 45/28 370/230 |
| 8,300,551 B2* | 10/2012 | Koop | ..................... | H04L 45/122 370/254 |
| 9,980,160 B2* | 5/2018 | Tilly | .................... | H04L 43/0829 |
| 10,084,665 B1* | 9/2018 | Arunachalam | ......... | H04L 47/82 |
| 10,374,945 B1* | 8/2019 | Dhanabalan | .......... | H04L 45/123 |
| 2002/0038373 A1* | 3/2002 | Border | ................ | H04L 47/2408 709/230 |
| 2003/0079005 A1* | 4/2003 | Myers | ..................... | H04L 45/04 709/223 |
| 2003/0123436 A1* | 7/2003 | Joseph | .................... | H04L 45/26 370/352 |
| 2006/0209851 A1* | 9/2006 | Scudder | .................. | H04L 45/22 370/401 |

(Continued)

*Primary Examiner* — Chris Parry
*Assistant Examiner* — Dixon F Dabipi (57) ABSTRACT

Described herein are systems, methods, and software to manage communication path configurations between edge gateways in a computing environment. In at least one implementation, a controller monitors network characteristics associated with routes from a first edge gateway to a second edge gateway and determines whether a first route configuration for the first edge gateway to communicate with the second edge gateway fails to satisfy criteria based on the network characteristics. If the first route configuration fails to satisfy the criteria, the controller determines a second route configuration and applies the second route configuration for the first edge gateway to communicate with the second edge gateway.

18 Claims, 6 Drawing Sheets

(56) References Cited

U.S. PATENT DOCUMENTS

| | | | | |
|---|---|---|---|---|
| 2009/0135729 A1* | 5/2009 | Saffre | .................... | H04L 45/306 370/252 |
| 2011/0261795 A1* | 10/2011 | Honegger | ............. | H04W 24/04 370/338 |
| 2012/0230201 A1* | 9/2012 | Thota | .................... | H04L 47/125 370/241 |
| 2013/0311160 A1* | 11/2013 | Cowie | .................... | H04W 40/20 703/13 |
| 2013/0329714 A1* | 12/2013 | Fan | .................... | H04W 72/1226 370/338 |
| 2014/0219077 A1* | 8/2014 | Zhou | ....................... | H04L 69/40 370/217 |
| 2015/0188949 A1* | 7/2015 | Mahaffey | ............... | H04W 12/37 726/1 |
| 2018/0309636 A1* | 10/2018 | Strom | .................... | H04L 41/147 |
| 2019/0036828 A1* | 1/2019 | Bajaj | .................... | H04L 41/5025 |
| 2020/0021516 A1* | 1/2020 | Bajaj | .................... | H04L 41/5051 |

\* cited by examiner

| APPLICATION ID COLUMN 410 | REQUIREMENT COLUMN 420 | REQUIREMENT COLUMN 421 | REQUIREMENT COLUMN 422 | REQUIREMENT COLUMN 423 |
|---|---|---|---|---|
| APPLICATION 411 | REQUIREMENT 430 | REQUIREMENT 431 | REQUIREMENT 432 | REQUIREMENT 433 |
| APPLICATION 412 | REQUIREMENT 434 | | | |
| APPLICATION 413 | REQUIREMENT 435 | REQUIREMENT 436 | | |
| APPLICATION 414 | REQUIREMENT 437 | REQUIREMENT 438 | | |

DYNAMIC ROUTE CONFIGURATION AND LOAD BALANCING FOR EDGE GATEWAYS

RELATED APPLICATIONS

Benefit is claimed under 35 U.S.C. 119(a)-(d) to Foreign Application Serial No. 201941047745 filed in India entitled "DYNAMIC ROUTE CONFIGURATION AND LOAD BALANCING FOR EDGE GATEWAYS", on Nov. 22, 2019, by VMWARE, INC., which is herein incorporated in its entirety by reference for all purposes.

TECHNICAL BACKGROUND

Organizations often employ multiple physical computing sites to provide the required operations for the associated organization. For example, an organization may employ a central datacenter and branch computing environments that can communicate with the central datacenter to access required data and applications operating in the datacenter. This network may be defined as a software-defined networking in a wide area network (SD-WAN) in some examples. To provide communications for the branch computing environments and the central data center, edge gateways can be employed that can provide various functions and services for the computing environments. These edge gateways may provide network services such as static routing, dynamic routing, virtual private networking, load balancing, firewall operations, Dynamic Host Configuration Protocol (DHCP), network address translation (NAT), or Internet Protocol Security (IPSec) communications.

In some implementations, the edge gateways may be used to direct or manage the communication routes from one branch to another branch. For example, a first branch may be required to communicate with a second branch to provide a video conference between the branches. To support the connection, the communication may be required to traverse an intermediary routing element, such as a gateway or hub edge gateway associated with a central datacenter. In some examples, multiple different communication routes may be used to provide the connections between the various edge gateways. However, it is often difficult and cumbersome to determine which of the communication routes should be used to provide the connections between the different edge gateways and branches of the computing network.

SUMMARY

The technology described manages communication route configurations between edge gateways in a computing environment. In one implementation, a controller applies a first route configuration for a first edge gateway to communicate with a second edge gateway and monitors network characteristics associated with routes from the first edge gateway to the second edge gateway. The controller further determines that the first route configuration fails to satisfy at least one criterion based on the network characteristics. In response to determining that the first route configuration fails to satisfy the at least one criterion, the controller determines a second connection route configuration based on the network characteristics and applies the second route configuration for the first edge gateway to communicate with second edge gateway.

DETAILED DESCRIPTION

Figure 1:
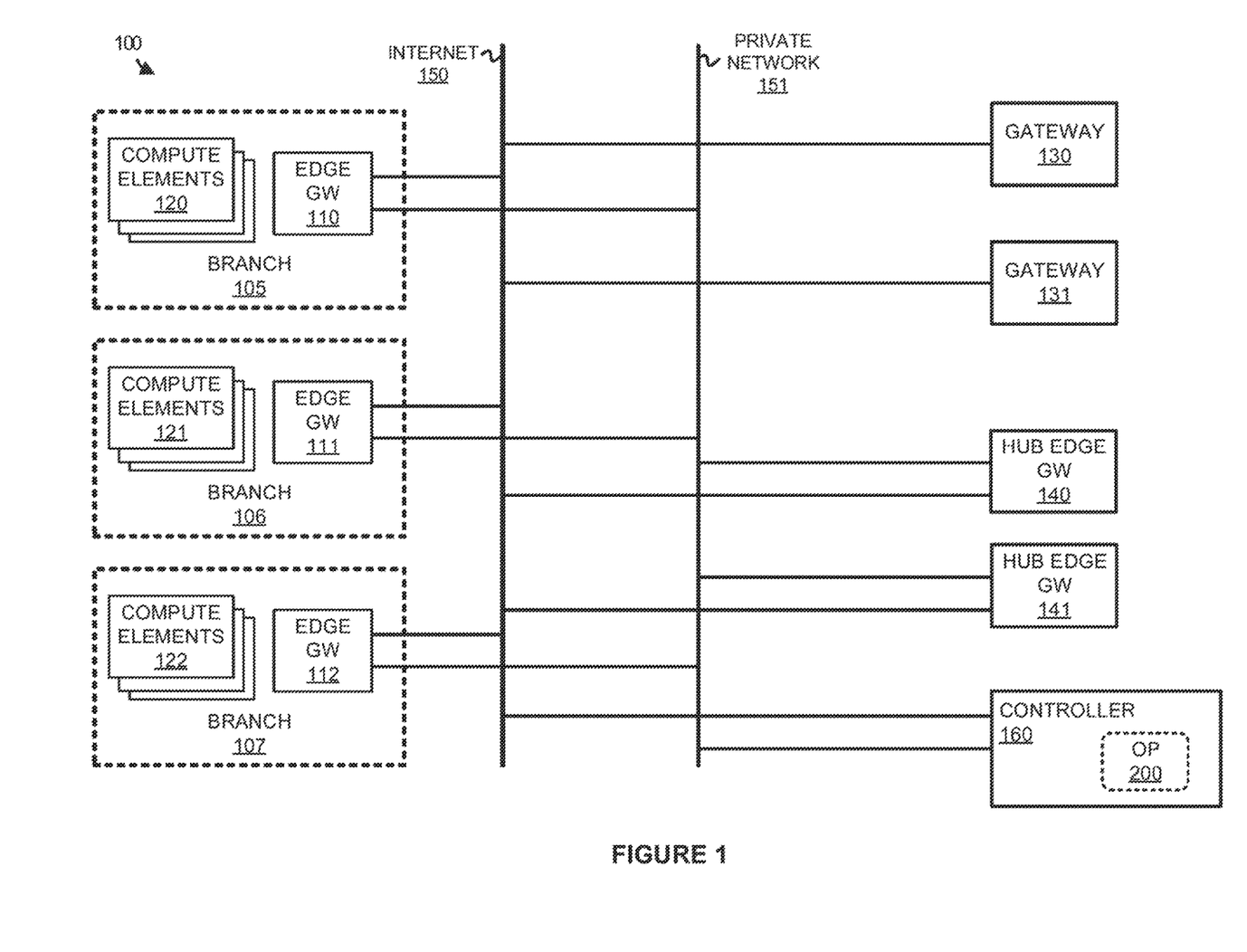
FIG. 1 illustrates a computing environment to manage communication paths between branches according to an implementation.

FIG. 1 illustrates a computing environment 100 to manage communication paths between branches according to an implementation. Computing environment 100 includes branches 105-107, wherein branches 105-107 include edge gateways 110-112 that provide connectivity for corresponding compute elements 120-122. Computing environment 100 further includes internet 150, private network 151, gateways 130-131, hub edge gateways 140-141, and controller 160. In some examples, computing environment 100 may represent a Wide Area Network (WAN) or software defined WAN (SD-WAN).

In operation, an organization may employ multiple computing sites with computing resources to provide different functions in different geographic regions. Here, compute elements 120-122 are deployed by an organization and are coupled to internet 150 and private network 151 using edge gateways 110-112. Compute elements 120-122 may be representative of virtual machines, containers, host computing systems, networking elements (switches, routers, and the like), or some other compute element. Edge gateways 110-112 are representative of network elements that can provide static routing, dynamic routing, virtual private networking, load balancing, firewall operations, Dynamic Host Configuration Protocol (DHCP), network address translation (NAT), or Internet Protocol Security (IPSec) communications.

As an example, gateway 130 may provide a connection to a cloud datacenter available to compute elements 120-122, wherein the datacenter may provide data and applications to the compute elements. In accessing the datacenter, communications from a compute element may be forwarded via the corresponding edge gateway to the data center using gateway 130.

In some implementations, computing elements across the different branches 105-107 may be required to communicate to provide various different functions. These functions may include video conferencing, file sharing, data processing, or some other function or service. As the different edge gateways for the corresponding branches may not be configured to directly communicate, the communications between the various edges may be required to traverse at least one gateway of gateways 130-131 or hub edge gateways 140-141, wherein the gateways and hub edge gateways may comprise next hops to deliver packets between the edge gateways. For example, one or more compute elements from branch 105 may be required to communicate with one or more compute elements from branch 107. To provide the communications, edge gateway 110 may route packets from the compute element to a hub edge gateway 140 via private network 151. Once received, the hub edge gateway may forward the packet to edge gateway 112 of branch 107 using private network 151. Private network 151 may represent a Multiprotocol Label Switching (MPLS) private network, a virtual private network (VPN), or some other private network that can be implemented between edge gateways and hub edge gateways. In at least one example, the hub edge gateways may be used to aggregate traffic from multiple edge gateways and, in some examples, provide access to additional services and/or data for the edge gateways.

In implementing the communication paths between the different branches, controller 160 is provided. Controller 160 may monitor network characteristics to determine how packets should be routed between the various branches. The network characteristics may include latency, data throughput, jitter, packet loss, or some other information related to the communication of data between the sites. Based on the network characteristics, controller 160 may modify or change the routing between the branches. Thus, while applications and compute elements for branch 105 may use a first route of hub edge gateway 140 to communicate with branch 107, controller 160 may change the route to using hub edge gateway 141 to provide the required communications.

In some implementations in addition to, or in place of, using the aforementioned information related to communication of data between the sites, controller 160 may further use information about the flow rate or the number of communication flows as a function of time handled by the edge gateway, gateway, or hub edge gateway. As the number of flows increase for a particular gateway or hub edge gateway, controller 160 may select another routing path for the communications to limit the communication flows traversing the gateway or hub edge gateway.

Figure 2:
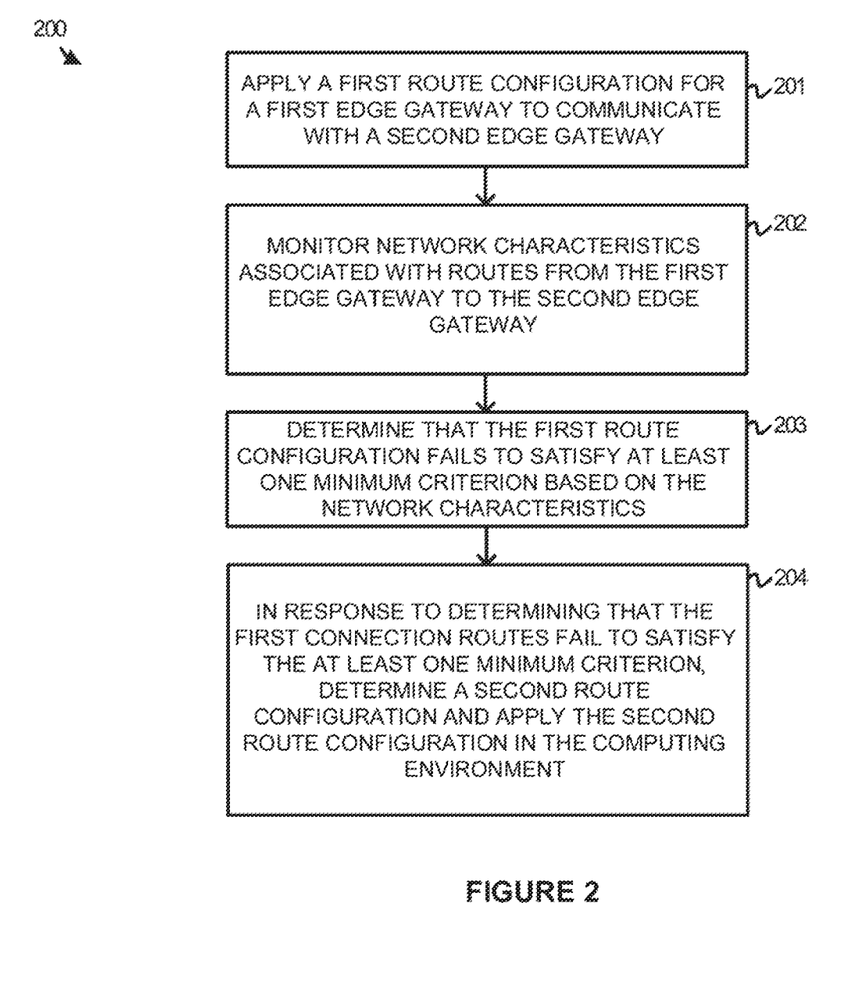
FIG. 2 illustrates an operation of a controller to manage communication paths between branches according to an implementation.

FIG. 2 illustrates an operation 200 of a controller to manage communication paths between branches according to an implementation. The processes of operation 200 are referenced parenthetically in the paragraphs that follow with reference to systems and elements of FIG. 1.

In operation, controller 160 applies (201) a first route configuration for a first edge gateway to communicate with a second edge gateway. For example, controller 160 may provide routing and communication configuration information to edge gateways 110-111 to permit communications between compute elements at branches 105-106. Additionally, in some instances, controller 160 may provide route configuration information to one or more of gateways 130-131 or hub edge gateways 140-141 to provide an intermediary for the communications. For example, to permit the communication between branches 110-111, edge gateways 110-111 may be configured to communicate using gateway 130.

After applying the first route configuration, controller 160 may monitor (202) network characteristics associated with routes from the first edge gateway to the second edge gateway. In some examples, edge gateways, hub edge gateways, and gateways may provide network characteristic information to controller 160. This information may be provided periodically, at the request of controller 160, during downtimes or low network usage times, or at some other interval. The information provided may include latency measurements, throughput measurements, jitter or packet loss reports, or some other network information associated with the quality of service provided at various network points.

While monitoring the network characteristics, controller 160 further determines (203) that the first route configuration fails to satisfy at least one criterion based on the network characteristics. In some examples, the criterion may comprise minimum or maximum values associated with latency, throughput, bandwidth, or some other value. In some implementations, the minimum or maximum values may be associated with individual applications and may be defined by an administrator associated with the computing environment. As an example, a file sharing application may have different minimum requirements or quality of service than a video conferencing application, wherein the video conferencing application may place a higher priority on latency than bandwidth. As a result, if latency for a connection between a first edge gateway and a second edge gateway fell below a minimum latency value, controller 160 may determine that the minimum criteria is no longer satisfied and that a new configuration is required.

In response to determining that the first route configuration fails to satisfy the at least one criterion, controller 160 may determine (204) a second mute configuration based on the network characteristics and apply the second route configuration for the first edge gateway to communicate with the second edge gateway. In some implementations, the second route configuration may use one or more different gateways or hub edge gateways to support the communications between the edge gateways. The different gateways and hub edge gateways may be identified based on gateways or hub edge gateways that are capable of providing the required minimum quality of service for the connection, may be selected based on gateways or hub edge gateways that are capable of providing the best quality of service for the connection, or may be selected in any other manner.

As an illustrative example, when the first route configuration for edge gateway 110 to communicate with edge gateway 111 fails to satisfy one or more criteria associated with the network characteristics, controller 160 may be required to identify a second route configuration. Thus, if the connection initially used gateway 130 for the communications, controller 160 may select a different communication path from gateway 131 or hub edge gateways 140-141 to provide the required connection.

In some implementations, the configuration modification may be based on a single application. For example, while a first application and a second application may be routed through the same gateway of gateways 130-131 as part of a first route configuration, when one or more criteria are satisfied to change to a second route configuration, the first application may be routed to a different gateway when the failed one or more criteria are only associated with the first application.

Figure 3:
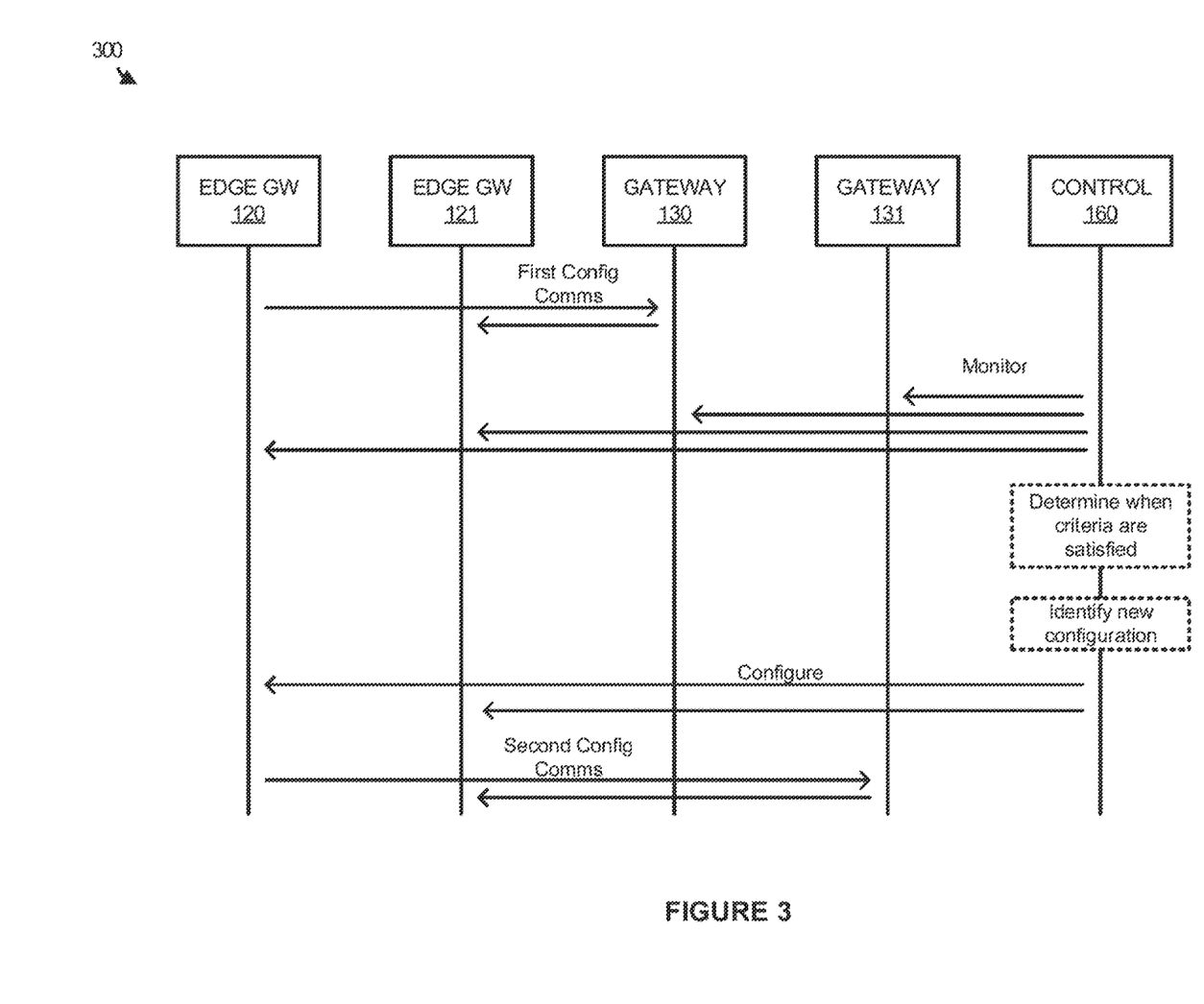
FIG. 3 illustrates a timing diagram to change communication path configurations for branch edges according to an implementation.

FIG. 3 illustrates a timing diagram 300 to change communication path configurations for branch edges according to an implementation. Timing diagram 300 includes edge gateways 120-121, gateways 130-131, and controller 160 from computing environment 100 of FIG. 1.

As described herein, to provide connectivity between different branches of a computing environment, edge gateways at each of the branches may be required to traverse gateways or hub edge gateways of the computing environment. In determining how the connections are routed between the branches and the edge gateways, controller 160 is provided that can dynamically modify the routes for the communications.

Here, edge gateway 120 is configured to communicate with edge gateway 121 using gateway 130, wherein gateway 130 is representative of a router that provides access for packets into and/or out of a local network. Gateway 130 may be representative of a connection to a router for an organization's central datacenter or a cloud datacenter in some examples. The communications between edge gateways 120-121 may comprise file sharing application packets, video or voice communication packets, or some other packets. In configuring the first route configuration, controller 160 may provide routing and permissions information to edge gateways 120-121 and gateway 130.

As the first configuration communications are exchanged, controller 160 further monitors network characteristics associated with the routes for edge gateways 120-121. In some implementations, in monitoring the routes, controller 160 may obtain network characteristic information or statistics from various networking elements in the computing environment, wherein the networking elements may comprise the edge gateways, the gateways, any hub edge gateways, or some other networking element. The networking elements may provide the information periodically, after a request from the controller, during a networking downtime, or at some other interval.

When the network characteristics are obtained, controller 160 may further determine when criteria are satisfied that indicates that the first route configuration requires a modification. In determining that the criteria are satisfied (or no longer satisfied) controller 160 may compare the network characteristics to values that can be defined by an administrator for the computing environment. These values may include a minimum available bandwidth, a maximum latency, a maximum error rate, or some other value. For example, for a video conferencing application a maximum latency value may be provided to controller 160 that can be used to compare against current network conditions or characteristics. When the latency for the first configuration fails to provide latency less than the maximum value, controller 160 may determine that the route configuration requires an update.

In response to determining that an update is required, controller 160 may identify a new configuration for the communications between edge gateway 120 and edge gateway 121. In some implementations, controller 160 may use the information from other edge gateways, gateways, hub edge gateways, or any other networking element to identify the new configuration. In some examples, controller 160 may identify any intermediary gateway or hub edge that can provide a minimum quality of service for the connection between the edge gateways. Once the subset of gateways and/or hub edges are identified, controller 160 may select a new intermediary for the communication randomly from the subset, may select the new intermediary based on the intermediary most likely to provide the highest quality of service, or may select the intermediary in any other manner. As an example, when edge gateways 120-121 require a new configuration, controller 160 may select a new intermediary gateway or hub edge gateway based on the network characteristics provided by the gateways and edge gateways. For example, based on the networking characteristics obtained from the computing environment, controller 160 may estimate the best intermediary for the communication based on the networking characteristics, and select the best intermediary using the estimation. The estimation may be based on current connections using the gateway or hub edge gateway, the current applications that traverse the gateway or hub edge gateway, physical location information associated with the gateway or hub edge gateway, or some other factor for the estimation.

Although described in the previous example as selecting a new intermediary gateway or hub edge gateway based on network characteristics identified for the gateways and hub edge gateways, it should be understood that that the new path may be randomly selected from the available intermediaries without consideration of the networking performance. In this manner, if the new intermediary fails to satisfy the communication criteria for the edge gateways, the process may be repeated as necessary until a suitable intermediary gateway or hub edge gateway is identified.

Here, controller 160 determines that gateway 131 should be used as the communication intermediary for edge gateways 120-121. As a result, controller 160 may apply the configuration by providing addressing, permissions, and other required rules, such that the communications between edge gateway 120 and edge gateway 121 traverse gateway 131 over gateway 130. Once configured, second communications are provided between edge gateways 120-121 using the second configuration. Although demonstrated as updating the configuration at edge gateways 120-121, it should be understood that a policy configuration may be provided to gateways 130-131 to provide the required operations.

In some examples, the configuration modification may be used to update the connections for all applications associated with a particular edge gateway. In other examples, the configuration modification may be unique to the needs of a specific application or group of applications. For example, if the first route configuration fails to provide adequate latency for a video communications application, controller 160 may make a modification to the networking configuration associated with that application. In some examples, this may permit the edge gateways to identify the application (or packet type) associated with a particular packet and forward the packet based on the configuration provided by controller 160.

In some examples, in addition to selecting the hub edge gateway or gateway for the communications of the applications, controller 160 may further differentiate between the use of internet 150 or private network 151. For example, as hub edge gateways 140-141 are coupled to both internet 150 and private network 151, controller 160 may monitor network characteristics associated with each of the networks and select one of the networks for the use by the edge gateways. Thus, controller 160 may select the gateway or hub edge gateway to support the communications and may further determine a network for the communications based on the network characteristics obtained for the hub edge gateways, the gateways, and the networks supported by network elements and gateways.

Although demonstrated in the previous examples as causing a configuration modification when the network characteristics fail to satisfy minimum quality of service criteria, it should be understood that the modification to the configuration may occur in response to other events or satisfying other criteria. For example, another event may occur when a second intermediary gateway or hub edge gateway provides a quality of service higher than the current intermediary, wherein the quality of service may be based on data throughput, bandwidth, latency, or some other factor, including combinations thereof. Once the quality of service differs by a requisite or threshold amount, the controller may change the route configuration to use the second intermediary element.

Figure 4:
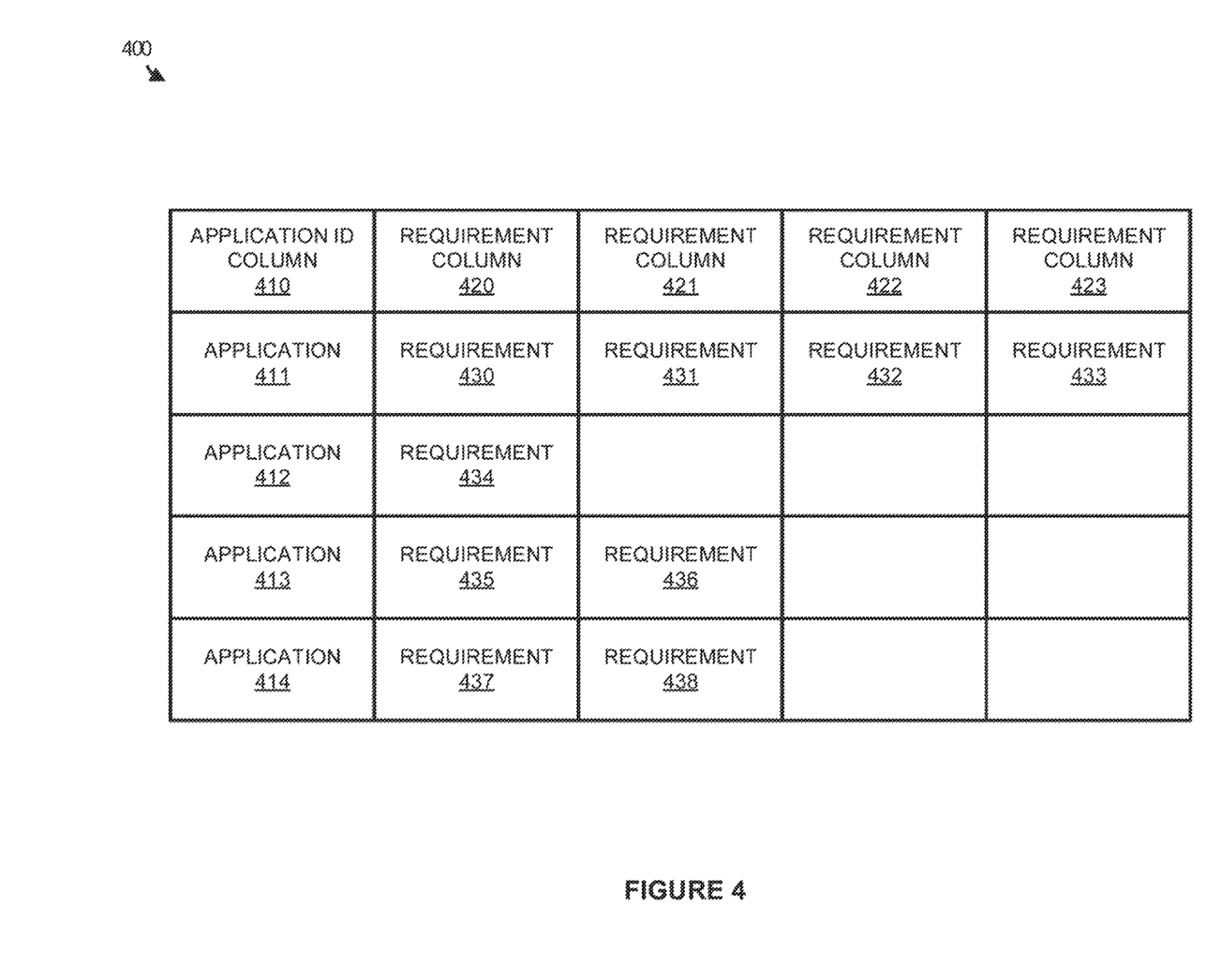
FIG. 4 illustrates a data structure to manage communication requirements associated with applications according to an implementation.

FIG. 4 illustrates a data structure 400 to manage communication requirements associated with applications according to an implementation. Data structure 400 includes application identifier column 410 and requirement columns 420-423. Application identifier column 410 includes applications 411-414, which are representative of applications deployed in a computing environment. Although demonstrated as individual applications, it should be understood that similar operations may be applied to groups of applications.

Requirement columns 420-423 further include requirements 430-438 that each correspond to a network requirement for an application. These requirements may include bandwidth requirements, throughput requirements, latency requirements, or some other networking requirement.

In some implementations, a controller for a computing network may maintain data structure 400, such that requirements 430-438 may be compared to network characteristics or statistical values obtained from networking elements in the computing environment. For example, a first edge gateway may communicate with a second edge gateway using a first route configuration. While using the first route configuration, network characteristics (statistical information) about the route configuration may be provided to the controller. Once received, the controller may compare the network characteristics to entries in data structure 400 to determine whether a modification is required to the first route configuration.

Here, the statistical minimum requirements are associated with individual applications. When the network characteristics are obtained that are associated with a first route configuration, the controller may determine applications that are associated with the first route configuration. Once the applications are identified, the computing system may determine whether the network characteristics provide the requisite quality of service for the applications. For example, if application 412 were communicating between a first edge gateway and a second edge gateway, then the controller may compare a network statistic from the network characteristics to requirement 434. If the network statistic satisfied requirement 434, then the controller may maintain the current configuration. If the network statistic did not satisfy requirement 434, then the controller may determine that a modification is required to the route configuration.

In some examples, the modification to the configuration may be made for all applications associated with a connection between edge gateways. Thus, if all applications at a first edge gateway used a first gateway to communicate with a second edge gateway, then the controller may change the route configuration from communicating via the first gateway to communicating via one or more other gateways or hub edge gateways. In other examples, rather than modifying the route or path associated with each of the applications, the controller may modify the route for one or more applications affected by a network condition. Returning to the example of requirement 434, when requirement 434 is no longer satisfied for application 412 in a route between two edge gateways, then the controller may modify a routing configuration associated with application 412 and the two edge gateways. This modification may include selecting a new intermediary gateway to provide the connection for the application, wherein the selection may comprise a random selection, a selection based on the network characteristics, or a selection based on some other similar factor.

Figure 5:
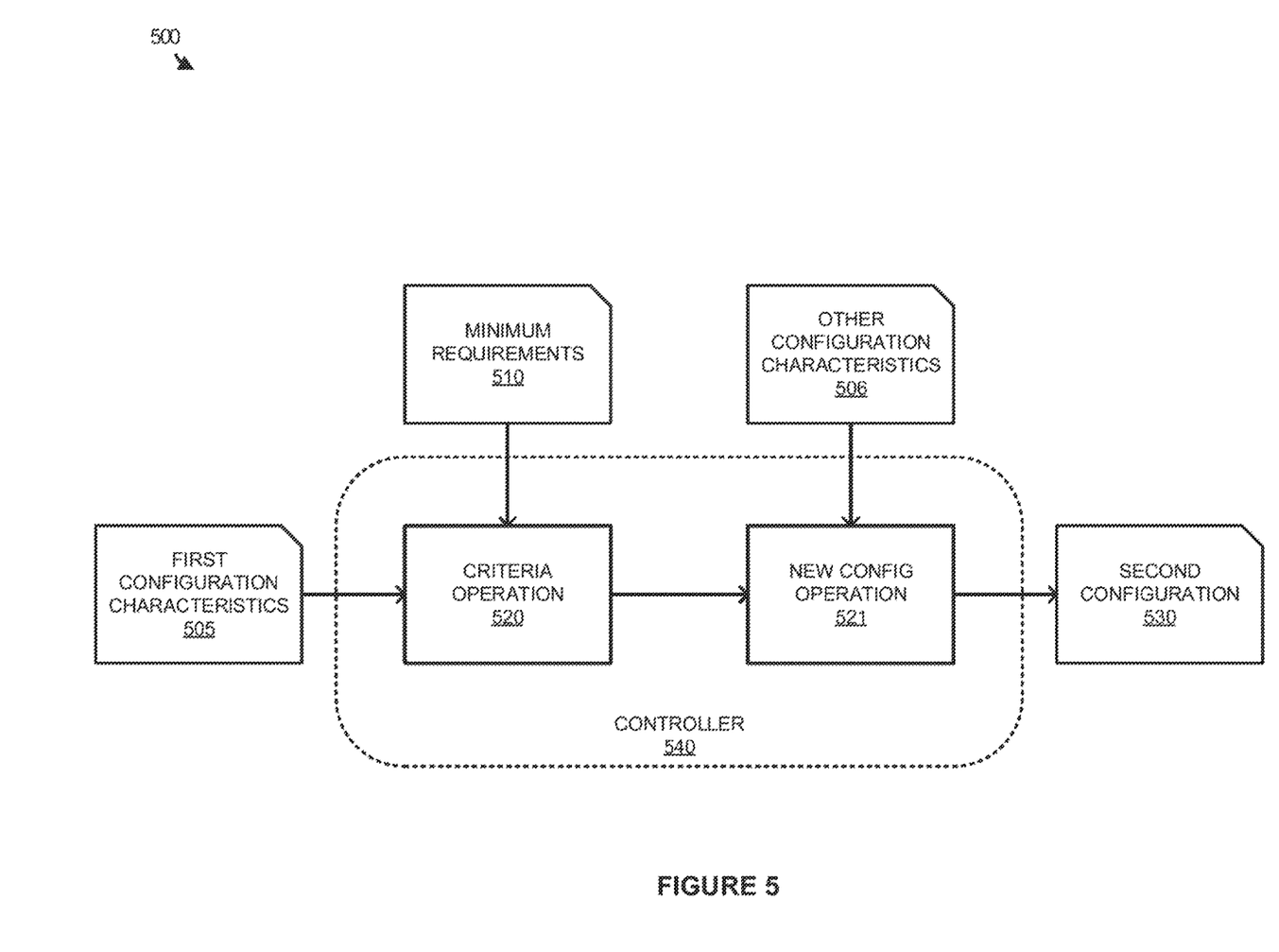
FIG. 5 illustrates an operational scenario of generating a new communication path configuration according to an implementation.

FIG. 5 illustrates an operational scenario 500 of generating a new communication path configuration according to an implementation. Operational scenario 500 includes first configuration characteristics 505, minimum requirements 510, other configuration requirements 506, and second configuration 530. Operational scenario 500 further includes operations 520-521 that are representative of operations that may be provided by a controller 540 for a computing environment that employs edge gateways, gateways, and, in some examples, hub edge gateways. The computing environment may comprise a SD-WAN for an organization in some examples.

As depicted, a controller may obtain first configuration characteristics 505 associated with a first route configuration between two edge gateways. As the configuration characteristics are obtained, the controller may perform criteria operation 520 by comparing first configuration characteristics 505 to minimum requirements 510 to determine whether the characteristics satisfy or fail to satisfy criteria associated with the application(s). The minimum requirements may correspond to connection requirements for all applications or may correspond to requirements associated with each individual application. For example, the minimum requirements associated with a file sharing application may be different than the requirements associated with a video conferencing application. As a result, while a current route may provide the minimum quality of service associated with the file sharing route, the same route configuration may fail to provide requisite quality of service associated with the video conferencing application.

Once it is determined that the current configuration fails to satisfy the minimum criteria for the application, the controller will further provide new configuration operation 521. New configuration operation 521 may identify other configuration characteristics 506, which are representative of network statistics associated with other routes from the first edge gateway to the second edge gateway. This information may include current available bandwidth for the other networking components in the network, any current latency values determined in association with the networking components, any throughput information associated with the other networking components, or some other information. From the information, new configuration operation 521 may select a new configuration for the edge gateways, such that the minimum requirements will be satisfied for the edge gateways and the corresponding applications.

In some implementations, the new route configuration may be selected based on the route that can provide the best quality of service to the applications based on the network characteristics. In other implementations, the new route configuration may be determined by first identifying set of intermediary components or gateways that can provide the required quality of service for the applications, and subsequently selecting one of the components or gateways from the set. The selected gateway or component may be selected randomly, based on which of the gateways or components can provide the highest quality of service, or some other load distribution for the intermediary gateways or components.

Here, the controller generates second configuration 530 and can apply the configuration in the computing environment or SD-WAN. Second configuration 530 may include new routes for a single application (i.e., the application affected by the degradation of the network characteristics) or may include new routes for any application associated with the first edge gateway to the second edge gateway.

In some implementations, rather than selecting the second route configuration using network characteristics associated with alternative routes, the controller may select the second route configuration using any of the available intermediary components. This new intermediary may be selected randomly, based on a current usage rate associated with the intermediary component, or based on some other load balancing factor. If the newly identified configuration fails to satisfy the minimum requirements associated with the one or more applications that execute behind the edge gateway, then the controller may be used to identify another new configuration to support the operations of the one or more applications.

Figure 6:
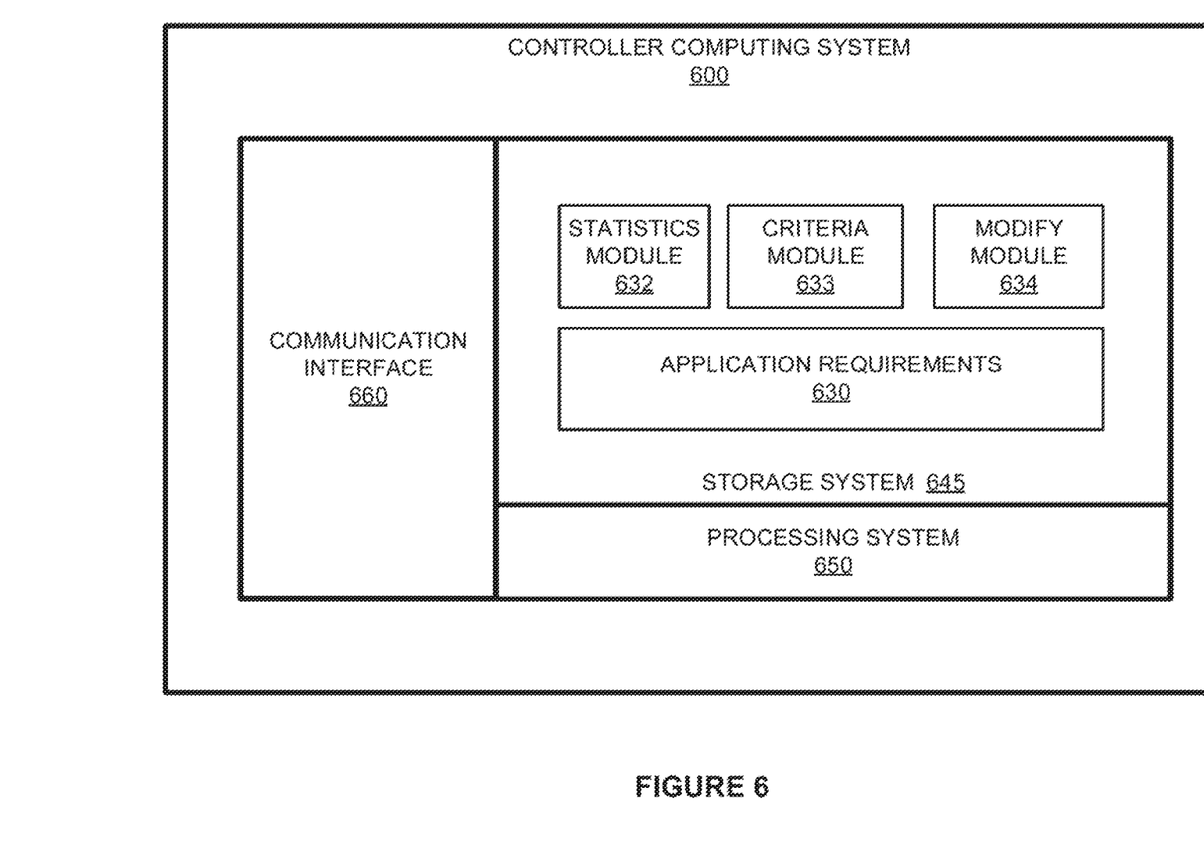
FIG. 6 illustrates a controller computing system to manage communication path configurations for edge branches according to an implementation.

FIG. 6 illustrates a controller computing system 600 to manage communication path configurations for edge branches according to an implementation. Computing system 600 is representative of any computing system or systems with which the various operational architectures, processes, scenarios, and sequences disclosed herein for an edge gateway. Computing system 600 is an example of gateway 160, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with one or more edge gateways, routers, hub edge gateways, or other similar components in a computing network or SD-WAN.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises statistics monitor 632, criteria monitor 633, and modify operation 634, although any number of software modules may perform the operations described herein. Storage system 645 further stores application requirements 630, which are representative of a data structure for network requirements associated with applications operating in the computing environment. The operating software on storage system 645 may further include an operating system, utilities, drivers, network interfaces, applications, or some other type of software. When read and executed by processing system 650 the operating software on storage system 645 directs computing system 600 to operate as described herein.

In at least one implementation, edge gateways may be configured at branches or computing sites for an organization to provide connectivity to other branches or central data centers associated with the organization. To provide connectivity between the different branches, an organization may employ controller computing system 600 to apply route configurations to the edge gateways, permitting the edge gateways to communicate using hub edge gateways and/or gateways that belong to the same SD-WAN network.

When a route configuration is deployed for a first edge gateway to communicate with a second edge gateway, statistics monitor 632 directs processing system 650 to monitor network characteristics associated with the routes from the first edge gateway to the second edge gateway. These network characteristics may comprise latency, throughput, jitter, packet loss, or some other network characteristic. The characteristic information may be obtained from the edge gateways, from gateways, from hub edge gateways, or from some other element associated with the computing network.

As the network characteristics are obtained, criteria monitor 633 directs processing system 650 to determine whether the first route configuration satisfies criteria associated with the connection between the first edge gateway and the second edge gateway. The criteria may be unique to each application or may correspond to a group of applications. In at least one example, criteria monitor 633 may determine what applications are executing behind the communicating edge gateway and identify requirements from application requirements 630 that correspond to the applications. If the criteria are satisfied, then the current configuration may remain for the first edge gateway and the second edge gateway. However, if the criteria are not satisfied, then modify operation 634 may direct processing system 650 to identify a new configuration for the communications between the edge gateways. For example, while the first configuration may use a first intermediary gateway for the communications, a second configuration may use a second intermediary gateway.

In some implementations, when determining the new configuration, modify operation 634 may use the network characteristics obtained from the network to identify a new intermediary capable of providing a requisite quality of service for the connection between the edge gateways. For example, based on the statistics, modify operation 634 may identify one or more intermediate gateways or hub edge gateways available to provide the requisite quality of service for the applications. Once identified, modify operation 634 may select at least one of the intermediate gateways or hub edge gateways for the new configuration. The selection may be based on identifying the best available quality of service, a random selection, or some other distribution mechanism.

Although demonstrated as using minimum requirements to trigger the modification to the route configuration, it should be understood that other events or criteria may be used to trigger the modification. In at least one example, computing system 600 may monitor the quality of service associated with different routes between the first edge gateway and the second edge gateway. When a new configuration can provide a quality of service that satisfies performance criteria, the new configuration may be selected and applied for the first edge gateway and the second edge gateway. In other implementations, computing system 600 may monitor degradation associated with the network characteristics and determine when a first route configuration has degraded to a threshold value. For example, computing system 600 may monitor latency as a function of time for a connection from the first edge gateway to the second edge gateway. When the latency is increased a threshold amount, the computing system may determine that a modification event has occurred and initiate operations to implement a new route configuration. While these are two examples of using criteria to trigger the modification to a route configuration, other criteria may be used, including quantities of connections using the intermediary gateway, processing resource usage by the intermediary gateway, or some other criteria that can load balance connections and/or provide dynamic quality of service modifications to the route configurations.

Although described as separate from the edge gateways in the examples of FIGS. 1-6, it should be understood that at least a portion of the operations described herein may be performed locally at the edge gateways. In particular, a first edge gateway communicating with a second edge gateway may monitor the network characteristics associated with the communications. From the monitoring the characteristics, the first edge gateway may determine when the characteristics fail to satisfy criteria to maintain the connection and may initiate operations to implement a change in the configuration.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   applying a first route configuration on a first edge gateway to communicate network traffic for at least a first application and a second application with a second edge gateway via a first intermediate gateway of a plurality of intermediate gateways, wherein the first intermediate gateway is in a different geographical location from the first and second edge gateways;
   monitoring network characteristics associated with routes from the first edge gateway to the second edge gateway in accordance with the first route configuration, wherein the network characteristics comprise at least network characteristics provided by the plurality of intermediate gateways for facilitating the routes from the first edge gateway and the second edge gateway;
   determining, from the monitoring, that the first route configuration fails to satisfy a minimum quality of service associated with the first application and that the first route configuration successfully satisfies a minimum quality of service associated with the second application;
   in response to the determining that the first route configuration fails to satisfy the minimum quality of service associated with the first application, determining a second route configuration based on the network characteristics, wherein the second route configuration provides a different route for the first application from the first edge gateway to the second edge gateway in relation to the first route configuration, the different route comprising a second intermediate gateway of the plurality of intermediate gateways and excluding the first intermediate gateway, wherein the second intermediate gateway is in a different geographical location from the first and second edge gateways; and
   applying the second route configuration on the first edge gateway to communicate the network traffic for the first application with second edge gateway, wherein the network traffic for the second application continues to be routed to the second edge gateway via the first intermediate gateway.

2. The method of claim 1, wherein the first application comprises a video conferencing application, a file sharing application, or data processing application.

3. The method of claim 1, wherein the network characteristics comprise latency, throughput, jitter, or packet loss.

4. The method of claim 1, wherein each of the first edge gateway or the second edge gateway comprise a router.

5. The method of claim 1, wherein the first intermediary gateway and the second intermediary gateway support software-defined networking in a wide area network (SD-WAN) associated with the first edge gateway and the second edge gateway.

6. The method of claim 1, wherein the network characteristics provided by the first intermediary gateway comprise a quantity of flows at the first intermediary gateway.

7. The method of claim 1, wherein:
   the first route configuration configures the first edge gateway to communicate with the second edge gateway via the first intermediate gateway and no other intermediate gateway of the plurality of intermediate gateways; and
   the second route configuration configures the first edge gateway to communicate with the second edge gateway for the first application via the second intermediate gateway and no other intermediate gateway of the plurality of intermediate gateways.

8. A computing system comprising:
   a storage system;
   a processing system operatively coupled to the storage system; and
   program instructions stored on the storage system that, when executed by the processing system, direct the processing system to:
   apply a first route configuration on a first edge gateway to communicate network traffic for at least a first application and a second application with a second edge gateway via a first intermediate gateway of a plurality of intermediate gateways, wherein the first intermediate gateway is in a different geographical location from the first and second edge gateways;
   monitor network characteristics associated with routes from the first edge gateway to the second edge gateway in accordance with the first route configuration, wherein the network characteristics comprise at least network characteristics provided by the plurality of intermediate gateways for facilitating the routes from the first edge gateway and the second edge gateway;
   determine, from the monitoring, that the first route configuration fails to satisfy a minimum quality of service associated with the first application and that the first route configuration successfully satisfies a minimum quality of service associated with the second application;
   in response to the determining that the first route configuration fails to satisfy the minimum quality of service associated with the first application, determine a second route configuration based on the network characteristics, wherein the second route configuration provides a different route for the first application from the first edge gateway to the second edge gateway in relation to the first route configuration, the different route comprising a second intermediate gateway of the plurality of intermediate gateways and excluding the first intermediate gateway, wherein the second intermediate gateway is in a different geographical location from the first and second edge gateways; and apply the second route configuration on the first edge gateway to communicate the network traffic for the first application with second edge gateway, wherein the network traffic for the second application continues to be routed to the second edge gateway via the first intermediate gateway.

9. The computing system of claim 8, wherein the first application comprises a video conferencing application, a file sharing application, or data processing application.

10. The computing system of claim 8, wherein the network characteristics comprise latency, throughput, jitter, or packet loss.

11. The computing system of claim 8, wherein each of the first edge gateway or the second edge gateway comprise a router.

12. The computing system of claim 8, wherein the first intermediary gateway and the second intermediary gateway support software-defined networking in a wide area network (SD-WAN) associated with the first edge gateway and the second edge gateway.

13. The computing system of claim 8, wherein the network characteristics provided by the first intermediary gateway comprise a quantity of flows at the first intermediary gateway.

14. The computing system of claim 8, wherein:
the first route configuration configures the first edge gateway to communicate with the second edge gateway via the first intermediate gateway and no other intermediate gateway of the plurality of intermediate gateways; and
the second route configuration configures the first edge gateway to communicate with the second edge gateway for the first application via the second intermediate gateway and no other intermediate gateway of the plurality of intermediate gateways.

15. A system comprising:
a first edge gateway;
a second edge gateway; and
a controller executing on at least one computer configured to:
apply a first route configuration on the first edge gateway to communicate network traffic for at least a first application and a second application with the second edge gateway via a first intermediate gateway of a plurality of intermediate gateways, wherein the first intermediate gateway is in a different geographical location from the first and second edge gateways;

monitor network characteristics associated with routes from the first edge gateway to the second edge gateway in accordance with the first route configuration, wherein the network characteristics comprise at least network characteristics provided by the plurality of intermediate gateways for facilitating the routes from the first edge gateway and the second edge gateway;

determine, from the monitoring, that the first route configuration fails to satisfy a minimum quality of service associated with the first application and that the first route configuration successfully satisfies a minimum quality of service associated with the second application;

in response to the determining that the first route configuration fails to satisfy the minimum quality of service associated with the first application, determine a second route configuration based on the network characteristics, wherein the second route configuration provides a different route for the first application from the first edge gateway to the second edge gateway in relation to the first route configuration, the different route comprising a second intermediate gateway of the plurality of intermediate gateways and excluding the first intermediate gateway, wherein the second intermediate gateway is in a different geographical location from the first and second edge gateways; and apply the second route configuration on the first edge gateway to communicate the network traffic for the first application with second edge gateway, wherein the network traffic for the second application continues to be routed to the second edge gateway via the first intermediate gateway.

16. The system of claim 15, wherein the network characteristics comprise latency, throughput, jitter, or packet loss.

17. The system of claim 15, wherein the first intermediary gateway and the second intermediary gateway support software-defined networking in a wide area network (SD-WAN) associated with the first edge gateway and the second edge gateway.

18. The system of claim 15, wherein:
the first route configuration configures the first edge gateway to communicate with the second edge gateway via the first intermediate gateway and no other intermediate gateway of the plurality of intermediate gateways; and
the second route configuration configures the first edge gateway to communicate with the second edge gateway for the first application via the second intermediate gateway and no other intermediate gateway of the plurality of intermediate gateways.

* * * * *